(12) United States Patent
Salter et al.

(10) Patent No.: US 10,173,582 B2
(45) Date of Patent: Jan. 8, 2019

(54) LIGHT SYSTEM

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,889

(22) Filed: Jan. 26, 2017

(65) Prior Publication Data
US 2018/0208105 A1 Jul. 26, 2018

(51) Int. Cl.
| | |
|---|---|
| *B60Q 1/26* | (2006.01) |
| *G09F 21/04* | (2006.01) |
| *G09F 13/00* | (2006.01) |
| *B60Q 1/00* | (2006.01) |
| *H05B 37/02* | (2006.01) |
| *B60Q 1/34* | (2006.01) |
| *F21S 43/20* | (2018.01) |
| *F21S 43/236* | (2018.01) |
| *B60J 1/08* | (2006.01) |

(52) U.S. Cl.
CPC ............ *B60Q 1/268* (2013.01); *B60Q 1/0011* (2013.01); *B60Q 1/34* (2013.01); *F21S 43/236* (2018.01); *F21S 43/255* (2018.01); *G09F 13/005* (2013.01); *G09F 21/048* (2013.01); *H05B 37/0272* (2013.01); *B60J 1/08* (2013.01); *B60Q 2400/10* (2013.01)

(58) Field of Classification Search
CPC .. B60Q 1/268; B60Q 1/0011; B60Q 2400/10; F21S 43/236; G09F 21/048; G09F 13/005
USPC ......................................................... 362/503
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,294,990 B1 | 9/2001 | Knoll et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Tsion Tumebo
(74) *Attorney, Agent, or Firm* — Jason Rogers; Price Heneveld LLP

(57) ABSTRACT

A window for a vehicle is provided herein. The window includes a light guide disposed between an outer panel and an inner panel. A light source is optically coupled with the light guide and is configured to direct excitation light towards a luminescent structure. The luminescent structure luminesces in response to receiving the excitation light. A controller is configured to illuminate the light source when an electronic device having an application thereon is in operation.

19 Claims, 8 Drawing Sheets

(56) References Cited

U.S. PATENT DOCUMENTS

| | | |
|---|---|---|
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,810,625 B2 | 11/2004 | Thomas |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 * | 8/2009 | Bucher .................. B60Q 1/302 362/231 |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,804,418 B2 | 9/2010 | Sullivan et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,333,492 B2 | 12/2012 | Dingman et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 * | 6/2013 | Lambert ................ B60K 35/00 250/461.1 |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,452,709 B2 | 9/2016 | Aburto Crespo |
| 9,568,659 B2 * | 2/2017 | Verger ............. B32B 17/10036 |
| 9,579,987 B2 | 2/2017 | Penilla et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 * | 4/2006 | Anderson, Jr. ........ B60K 35/00 362/23.01 |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 * | 10/2009 | Kino ..................... B60Q 1/323 362/602 |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 * | 11/2012 | Dellock .................... B60R 1/06 296/1.08 |
| 2013/0009855 A1 | 1/2013 | Gaily et al. |
| 2013/0038712 A1 | 2/2013 | Valaix |
| 2013/0050979 A1 | 2/2013 | Van De Ven et al. |
| 2013/0092965 A1 | 4/2013 | Kijima et al. |
| 2013/0154821 A1 | 6/2013 | Miller et al. |
| 2013/0155723 A1 * | 6/2013 | Coleman .............. G02B 6/0018 362/621 |
| 2013/0335994 A1 * | 12/2013 | Mulder .................... F21V 9/00 362/555 |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |

(56) References Cited

U.S. PATENT DOCUMENTS

| | | |
|---|---|---|
| 2015/0138789 A1 | 5/2015 | Singer et al. |
| 2015/0199041 A1* | 7/2015 | Salter .................. G06F 3/042 345/174 |
| 2015/0267881 A1 | 9/2015 | Salter et al. |
| 2015/0307033 A1 | 10/2015 | Preisler et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0039364 A1 | 2/2016 | Findlay et al. |
| 2016/0082880 A1 | 3/2016 | Co et al. |
| 2016/0102819 A1 | 4/2016 | Misawa et al. |
| 2016/0131327 A1 | 5/2016 | Moon et al. |
| 2016/0214535 A1 | 7/2016 | Penilla et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0213165 A1 | 7/2017 | Stauffer et al. |
| 2017/0253179 A1 | 9/2017 | Kumada |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014013239 A1 | 1/2014 |
| WO | 2014068440 A1 | 5/2014 |
| WO | 2014161927 A1 | 10/2014 |

* cited by examiner

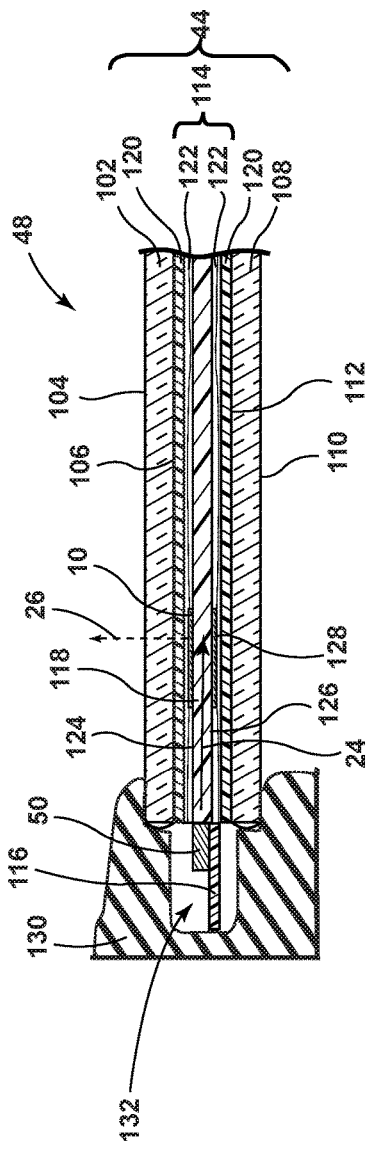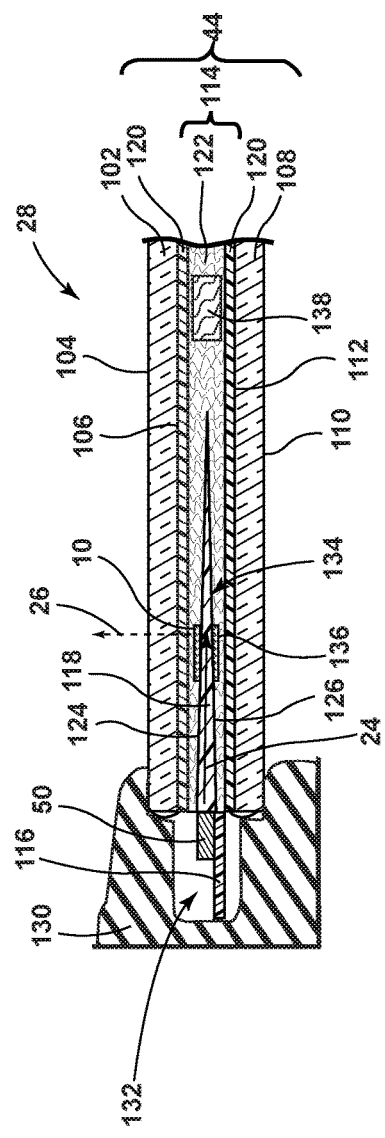

US 10,173,582 B2

LIGHT SYSTEM

FIELD OF THE INVENTION

The present disclosure generally relates to vehicle decals, and more particularly, to an illuminable decal.

BACKGROUND OF THE INVENTION

Decals are commonly employed on vehicles to display a vehicle manufacturer's logo, a company's logo, or other graphic display. For some vehicles, it may be desirable to have a more prominent upscale decal to enhance the attractiveness of the vehicle.

SUMMARY OF THE INVENTION

According to one aspect of the present invention, a window for a vehicle is disclosed. The window includes a light guide disposed between an outer panel and an inner panel. A light source is optically coupled with the light guide and is configured to direct excitation light towards a luminescent structure. The luminescent structure luminesces in response to receiving the excitation light. A controller is configured to illuminate the light source when an electronic device having an application thereon is in operation.

According to another aspect of the present invention, a light system for a vehicle is disclosed. The light system includes a light source optically coupled with a light guide. The light guide is configured to direct light towards a luminescent structure. The luminescent structure luminesces in response to receiving excitation light from the light source. An electronic device is in communication with the light source. An indicia is defined by the luminescent structure. The indicia luminesce in response to usage of the electronic device.

According to yet another aspect of the present invention, a light system for a vehicle is disclosed. The light system includes a light source optically coupled to a light guide. An indicia is defined by a luminescent structure that luminesces in response to receiving excitation light from the light source. A controller is configured to activate the light source based on an initiation of an application on an electronic device that is in communication with the controller.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a cross-sectional view of the light system taken along the line V-V of FIG. 2 illustrating the light system, according to one embodiment, having a light guide disposed between an outer panel and an inner panel;

FIG. 6 is a cross-sectional view of the light system taken along the line V-V of FIG. 2 illustrating the light system, according to an alternate embodiment, including a light guide having a tapered core disposed between an outer panel and an inner panel;

DETAILED DESCRIPTION OF THE PREFERRED EMBODIMENTS

Figure 2:
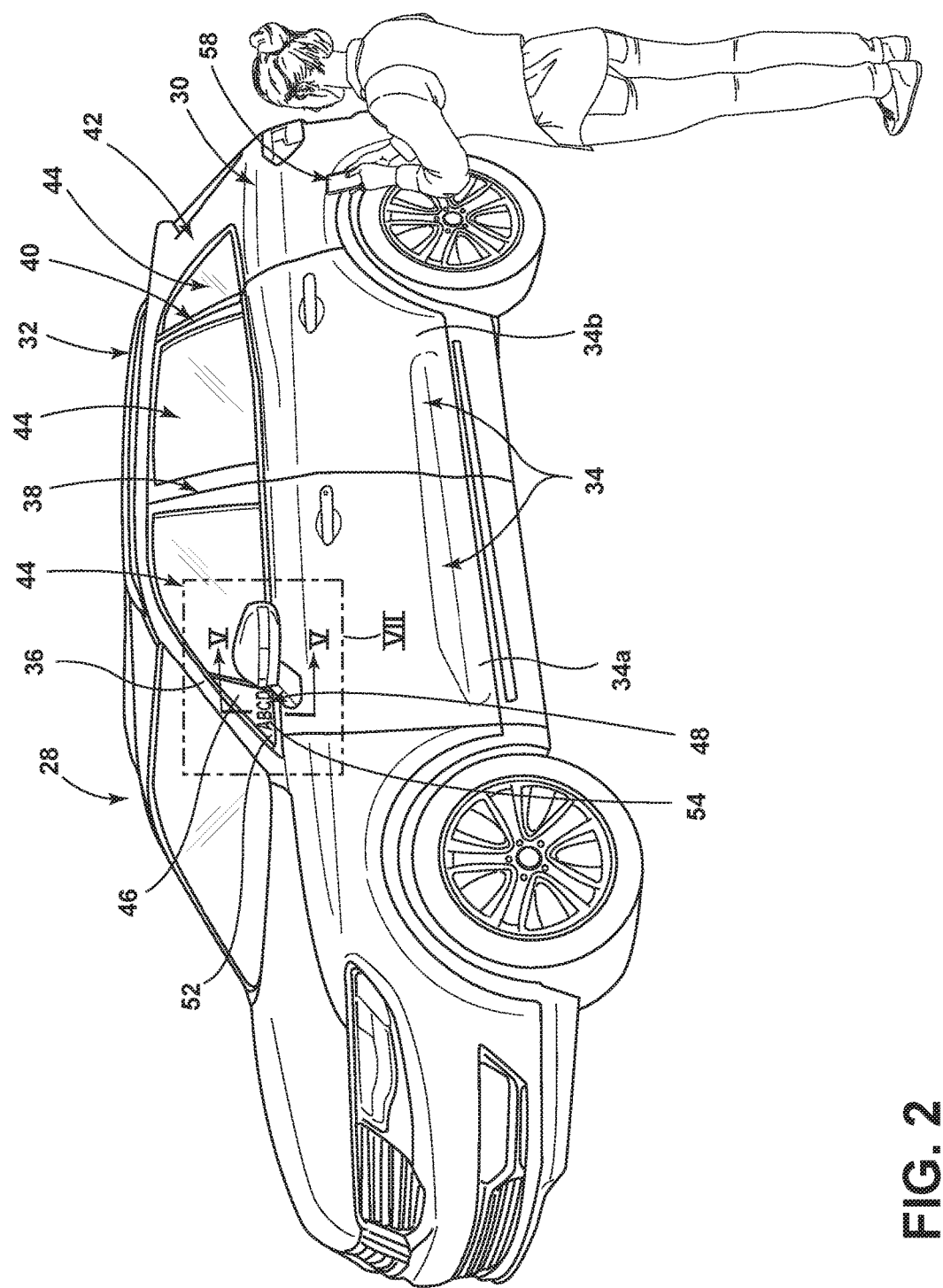
FIG. 2 is a front perspective view of a light system disposed within a window of a vehicle.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system. The light system may advantageously employ one or more phosphorescent and/or luminescent structures to illuminate in response to predefined events. The one or more luminescent structures may be configured to convert light received from an associated light source and re-emit the light at a different wavelength typically found in the visible spectrum.

Figure 1A:
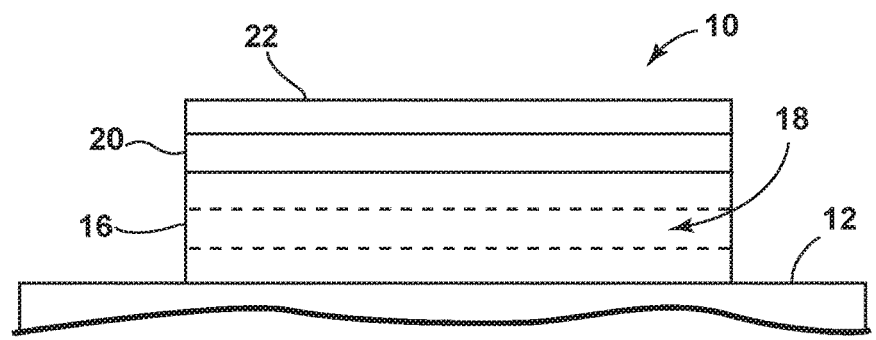
FIG. 1A is a side view of a luminescent structure rendered as a coating for use in a luminescent latch assembly according to one embodiment.
Figure 1B:
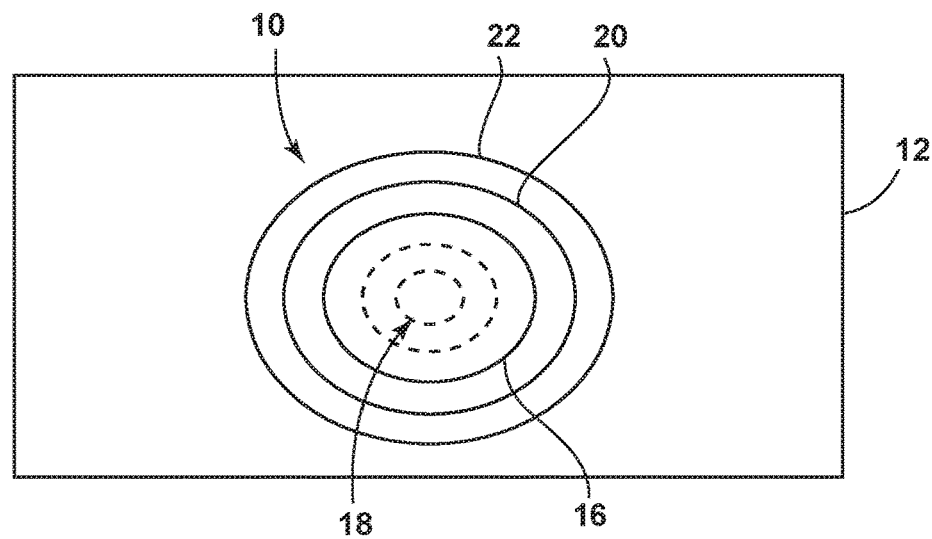
FIG. 1B is a top view of a luminescent structure rendered as a discrete particle according to one embodiment.
Figure 1C:
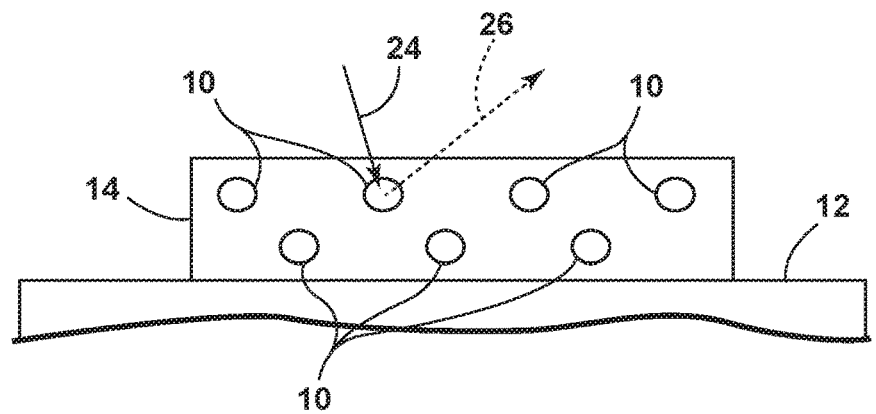
FIG. 1C is a side view of a plurality of luminescent structures rendered as discrete particles and incorporated into a separate structure.
Figure 4:
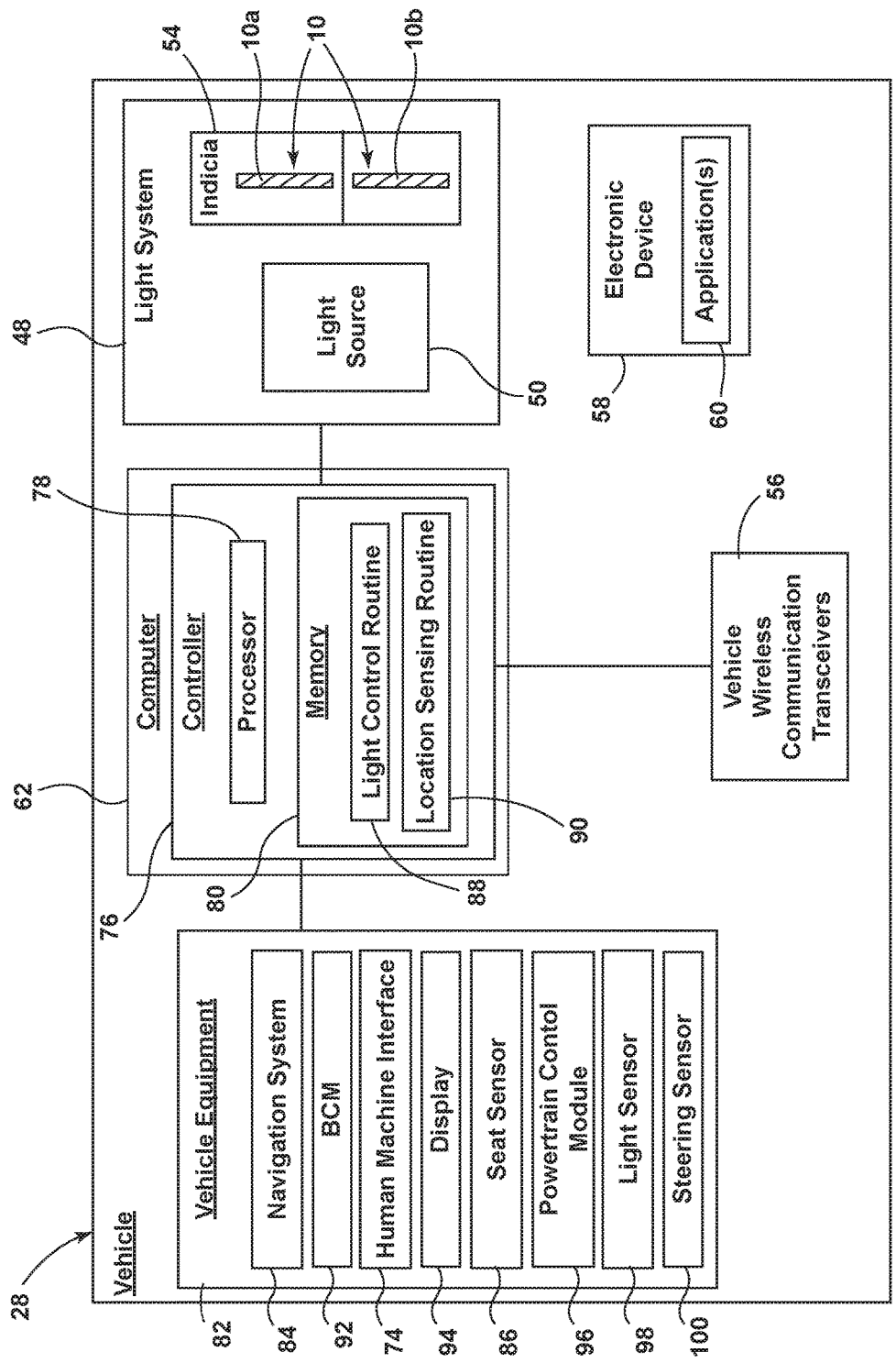
FIG. 4 is a block diagram of a vehicle having the light system therein that is capable of communicating with an electronic device, according to one embodiment.

Referring to FIGS. 1A-1C, various exemplary embodiments of luminescent structures 10 are shown, each capable of being coupled to a substrate 12, which may correspond to a vehicle fixture or vehicle related piece of equipment 82 (FIG. 4). In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 50 (FIG. 4) (such as an artificial light source and/or the sun) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 50. According to one embodiment, a ZnS:Ag phosphor may be used to create a blue-converted light 26. A ZnS:Cu phosphor may be utilized to create a yellowish-green converted light 26. An $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to one embodiment, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to one embodiment, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 50 that emit the excitation light 24, including, but not limited to, natural light sources (e.g., the sun) and/or any artificial light sources 50. The periodic absorption of the excitation light 24 from any excitation source may provide for a substantially sustained charge of the long-persistence luminescent material 18 to provide for consistent passive illumination. In some embodiments, a light sensor 98 may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$, and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a vehicle 28 includes a body 30 and a roof 32. The body 30 includes a plurality of doors 34. The doors 34 include a driver door 34a and a passenger door 34b. The vehicle 28 further includes an A-pillar 36, a B-pillar 38, a C-pillar 40, and a D-pillar 42 that support the roof 32. It will be appreciated, however, that the vehicle 28 may have any number of longitudinally disposed pillars 36, 38, 40, 42 without departing from the scope of the present disclosure. Furthermore, the vehicle 28 is depicted as a sports utility vehicle, but it will be understood that the vehicle 28 may be a truck, van, sedan, or other type of vehicle 28 without departing from the teachings provided here.

The pillars 36, 38, 40, 42 are separated by the doors 34. Each of the doors 34 may include a window 44. The window 44 may be made of a glass or any other substantially transparent and/or translucent material. Additionally, and/or alternatively, plurality of quarter windows 46 may be disposed on the vehicle 28. For example, the quarter windows 46 may be proximate the A-pillar 36, positioned vehicle forward of the driver door 34a, and/or extend therefrom. Additionally, and/or alternatively, the quarter windows 46 may be proximate the C-pillar 40, disposed vehicle rearward of the passenger door 34b, and/or extend from the passenger door 34b. The quarter windows 46 may contact any of the pillars 36, 38, 40, 42 and/or be positioned within the A-pillar 36, B-pillar 38, C-pillar 40 (i.e., as opera windows), etc. The quarter windows 46 may also be stationary (e.g., permanently sealed) or openable.

The vehicle 28 further includes a vehicle light system 48 on, or within, one or more of the windows 44, such as the front quarter window 46, of the vehicle 28 and may be configured as an illuminable decal in some embodiments. The light system 48 includes a light source 50 (FIG. 4) and a luminescent structure 10 configured to luminesce in response to receiving excitation light 24 emanated from the light source 50. The luminescent structure 10 may be disposed on a lower portion 52, or any other portion, of the front quarter window 46 and may be generally non-visible when in a non-excited state. According to the presently illustrated embodiment, luminescent structure 10 defines one or more indicia 54 that confer any desired information laterally outward (i.e., vehicle side-to-side), forwardly of, and/or rearwardly of the vehicle 28. For example, the indicia 54 may define a notification symbol, or other information, when the luminescent structure 10 luminesces.

According to one embodiment, the vehicle 28 may be utilized for commercial purposes and the indicia 54 may notify customers of information about the vehicle 28 and/or a commercial entity or affiliation utilizing the vehicle 28. For example, the indicia 54 may illuminate when the vehicle 28 is being used as a ride-providing (chauffeuring) vehicle 28 and/or a ride-sharing vehicle 28. In such circumstances, the indicia 54 may notify potential occupants, or customers, of the corporation and/or affiliation of the vehicle 28. Moreover, the light system 48 may have a plurality of indicia 54 that are independently illuminable depending on the usage of the vehicle 28 at various times.

In various embodiments, the light system 48 may illuminate a predefined set of indicia 54 while an electronic device 58 is operating an application 60 (FIG. 4) on the electronic device 58. For example, when a driver opens and begins to operate a commercial application 60, or program, on the electronic device 58, such as a ride-providing service, the light system 48 illuminates indicia 54 correlating to the application 60 on the electronic device 58. When the vehicle 28 operator terminates the application 60, the light system 48 may return the light source 50 therein to a deactivated state and/or the luminescent structure 10 to a non-luminescent state. The indicia 54 may indicate the company or affiliation of the ride-providing service, occupancy status of the vehicle 28, etc.

Figure 3:
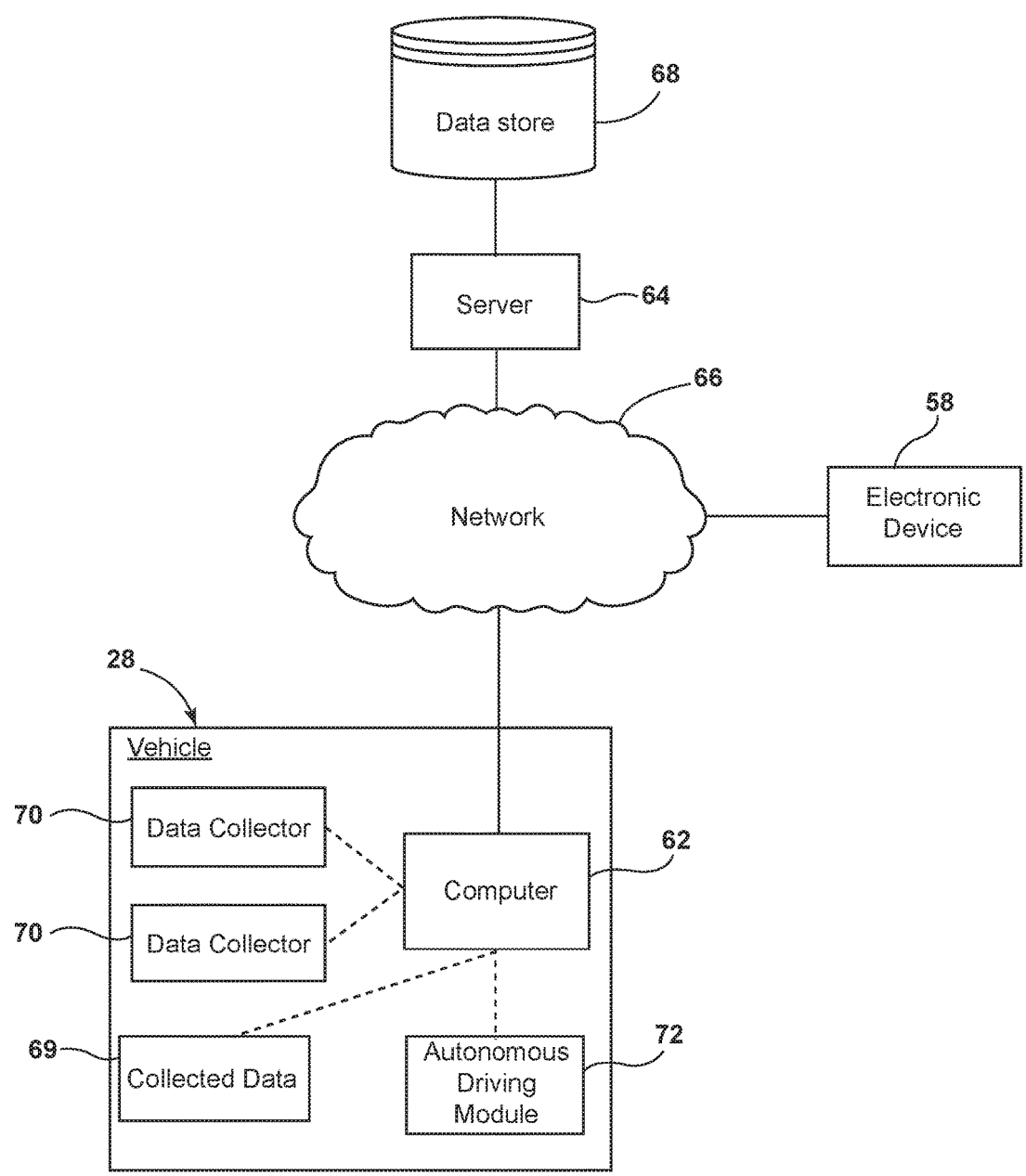
FIG. 3 is a block diagram of an exemplary autonomous vehicle system, according to one embodiment.

Referring to FIGS. 3 and 4, the vehicle 28 may be a manually operated vehicle (i.e. using a human driver) or may be autonomously driven by an on-board computer 62. Additionally, or alternatively, the vehicle 28 may be remotely controlled (e.g., via an operator located in a different location). In autonomous embodiments, one of which is exemplarily illustrated in FIG. 3, the computer 62 may be configured for communicating with one or more remote sites such as a server 64 via a network 66. The one or more remote sites may include a data store 68. The vehicle 28, including the computer 62, is configured to receive information, e.g., collected data 69, from one or more data collectors 70 related to various components of the vehicle 28, e.g., a steering wheel, brake pedal, accelerator pedal, gearshift lever, etc. The computer 62 generally includes an autonomous driving module 72 that includes instructions for autonomously, i.e., without some, or any, operator input, operating the vehicle 28, including possibly in response to instructions received from the server 64. Further, the computer 62, e.g., in the module 72, generally includes instructions for receiving data, e.g., from one or more data collectors 70 and/or a human machine interface (HMI) 74, such as an interactive voice response (IVR) system, a graphical user interface (GUI) including a touchscreen or the like, etc.

By determining driver characteristics and/or vehicle 28 operating conditions, the module 72 may determine an appropriate control or controls to be applied to one or more vehicle components. For example, the module 72 may determine whether and when a steering wheel should be moved to mimic or approximate vehicle 28 steering being conducted as part of an autonomous driving operation, e.g., autonomous driving according to instructions from the server 64 and/or the module 72.

The vehicle 28 includes a vehicle computer 62 that generally includes a controller 76 having a processor 78 and a memory 80, the memory 80 including one or more forms of computer-readable media, and storing instructions executable by the processor 78 for performing various operations. Further, the computer 62 may include more than one computing device, e.g., controllers 76 or the like included in the vehicle 28 for monitoring and/or controlling various vehicle components, e.g., an engine control unit (ECU), transmission control unit (TCU), etc. The computer 62 is generally configured for communications on a controller area network (CAN) bus or the like. The computer 62 may also have a connection to an onboard diagnostics connector (OBD-II). Via the CAN bus, OBD-II, and/or other wired or wireless mechanisms, the computer 62 may transmit messages to various devices in the vehicle 28 and/or receive messages from the various devices, e.g., controllers 76, actuators, sensors, electronic devices 58, etc., including data collectors 70. In addition, the computer 62 may be configured for communicating with the network 66, which, may include various wired and/or wireless networking technologies, e.g., cellular, Bluetooth, wired and/or wireless packet networks, etc.

The controller 76 may be a dedicated or shared controller and may include the processor 78 and memory 80, according to one embodiment. It should be appreciated that the controller 76 may include control circuitry such as analog and/or digital control circuitry. Logic is stored within memory 80 and executed by the processor 78 for processing the various inputs and controlling the light source 50, as described herein. The processor 78 may include one or more routines such as a light control routine 88 and/or a location sensing routine 90. According to one embodiment, the location sensing routine 90 may utilize the signal strength and time to return of the signals between a wireless communication transceiver 56 and the electronic device 58 to triangulate the cabin location of the electronic device 58. The light control routine 88 may illuminate the light source 50 in a plurality of wavelengths based on a variety of inputs, such as which application 60 is running on the electronic device 58 and/or the status of the vehicle 28 while the application 60 is running.

Instructions may be stored in and executed by the computer 62 in the autonomous driving module 72. Using data received in the computer 62, e.g., from the data collectors 70, the server 64, etc., the module 72 may control various vehicle 28 components and/or operations without a driver to operate the vehicle 28. For example, the module 72 may be used to regulate vehicle 28 speed, acceleration, deceleration, steering, operation of components such as lights, windshield wipers, etc. Further, the module 72 may include instructions for evaluating information received in the computer 62 relating to vehicle 28 operator characteristics, e.g., from the HMI 74 and/or the data collectors 70.

The data collectors 70 may include a variety of vehicle equipment 82. For example, various controllers 76 in the vehicle 28 may operate as data collectors 70 to provide data 69 via the CAN bus, e.g., data 69 relating to vehicle speed, acceleration, etc. Further, sensors or the like, global positioning system (GPS) equipment, navigation systems 84, etc., could be included in the vehicle 28 and configured as data collectors 70 to provide data directly to the computer 62, e.g., via a wired or wireless connection. Sensor data collectors 70 could include mechanisms such as RADAR, LIDAR, sonar, etc. sensors that could be deployed to measure a distance between the vehicle 28 and other vehicles or objects. Yet other sensor data collectors 70 could include cameras, breathalyzers, motion detectors, etc., i.e., data collectors 70 to provide data for evaluating a condition or state of a vehicle 28 operator. In addition, the data collectors 70 may include sensors to detect a position, change in position, rate of change in position, etc., of vehicle components such as a steering wheel, brake pedal, accelerator, gearshift lever, etc.

The memory 80 of the computer 62 generally stores the collected data 69. The collected data 69 may include a variety of data collected in the vehicle 28. Examples of collected data 69 are provided above, and moreover, the data 69 is generally collected using the one or more data collectors 70, and may additionally include data calculated therefrom in the computer 62, and/or at the server 64. In general, the collected data 69 may include any data that may be gathered by a collection device and/or computed from such data 69. For example, the collected data 69, as mentioned above, may include data concerning a position, change in position, rate of change in position, etc., of the vehicle 28 components such as a steering wheel, brake pedal, accelerator, gearshift lever, etc.

The network 66 represents one or more mechanisms by which a vehicle computer 62 may communicate with a remote server 64. Accordingly, the network 66 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 66 include wireless communication networks (e.g., using Bluetooth, IEEE 802.11, etc.), local area networks (LAN) and/or wide area networks (WAN), including the Internet, providing data communication services.

The server 64 may be one or more computer servers, each generally including at least one processor and at least one memory, the memory storing instructions executable by the processor, including instructions for carrying out various steps and processes described herein. The server 64 may include or be communicatively coupled to a data store 68 for storing the collected data 69, as well as parameters for evaluating operator input, e.g., parameters for a specific vehicle operator, a specific vehicle 28, particular weather or other environmental conditions, etc. further, the server 64 may store information related to multiple vehicles 28, traffic conditions, weather conditions, etc., within a geographic area, with respect to a particular road, city, etc. The server 64 could also be configured to provide drive-by-wire instructions to vehicles 28 in an autonomous driving area, e.g., a road, etc., such as an "all stop" instruction for all vehicles 28 to stop, a speed restriction, a lane restriction, etc.

With further reference to FIGS. 3 and 4, the light system 48 may include one or more light sources 50 that illuminate the one or more indicia 54, which may be defined by one or more luminescent structures 10a, 10b. In response, the luminescent structures 10a, 10b may be configured to convert excitation light 24 received from the associated light source 50 into light having a wavelength in the visible spectrum. Each luminescent structure 10a, 10b may luminescence in response to a different wavelength of excitation light emitted from the light source 50. Accordingly, the indicia 54 may independently and/or contemporaneously luminesce.

In operation, the wireless communication transceiver 56 is configured to interact with the electronic device 58 in order to detect its presence within the vehicle 28. In various embodiments, the wireless communication transceiver 56 may be configured to communicate with the electronic device 58 using Bluetooth™ low energy signals. In alternative embodiments, the vehicle 28 and/or the light system 48 may utilize other forms of wireless communication between the wireless communication transceiver 56 and the electronic device 58 such as, but not limited to, Wi-Fi™. The wireless communication transceiver 56 is configured to transmit and receive wireless signals (e.g., Bluetooth™ low energy signals) to and from the electronic device 58. Additionally, the wireless communication transceiver 56 may communicate with the controller 76.

The electronic device 58 may be any one of a variety of computing devices and may include a processor and a memory. For example, the electronic device 58 may be a cellphone, mobile communication device, a key FOB, wearable device (e.g., fitness band, watch, glasses, jewelry, wallet), apparel (e.g., a tee shirt, gloves, shoes or other accessories), personal digital assistant, headphones and/or other devices that includes capabilities for wireless communications using IEEE 802.11, Bluetooth, and/or any other wired or wireless communications protocols.

The electronic device 58 may include one or more applications 60 that communicate with the wireless communication transceiver 56. In some embodiments, the applications 60 may also enable the electronic device 58 to interface with the controller 76. In one example, the applications 60 may enable the electronic device 58 to wirelessly communicate with the light system 48 through the wireless communication transceiver 56 and/or the controller 76 to activate and deactivate the light source 50. For example, when the vehicle 28 is used for commercial purposes, an associated application 60 that is used through the electronic device 58 may be used. The light system 48 may illuminate the light source 50 in accordance with usage of the application 60 causing the indicia 54 that corresponds with the commercial entity or affiliation that is currently being utilized on the electronic device 58 to luminesce. Once the application 60 is closed, or passengers are within the vehicle 28, the light source 50 may be deactivated.

With continued reference to FIGS. 3 and 4, the controller 76 may communicate with the vehicle equipment 82 to receive information and illuminate the light source 50 based on the information. In the depicted embodiment, the vehicle equipment 82 includes the navigation system 84, a body control module (BCM) 92, the HMI 74, a display 94, a powertrain control module (PCM) 96, a light sensor 98, a steering sensor 100, and/or a seat sensor 86 each of which provides information to the controller 76 that may be used to determine the operation of the light system 48. For example, the navigation system 84 may provide the controller 76 with information related to the progress of a trip (e.g., ETA, distance, etc.). Additionally, the navigation system 84 may also cooperate with the electronic device 58 and/or the application 60 initiated thereon to provide driving instructions through the navigation system 84. The application 60 and navigation system 84 may also cooperate with the light system 48 such that the light system 48 is initiated as the vehicle 28 approaches a customer of the vehicle 28. Once the customer is within the vehicle 28, the light system 48 may be deactivated so as to not disturb the driver of the vehicle 28 while the vehicle 28 is in motion.

The BCM 92 and/or PCM 96 may provide the controller 76 with information related to the vehicle 28 such as a door status (e.g., locked/unlocked), a seat belt status (e.g., buckled/unbuckled), a vehicle speed, etc. Through the HMI 74 or the electronic device 58, the operator of the vehicle 28 may select to have the light source 50 illuminate when the vehicle 28 is in park and/or when the vehicle 28 is moving below a pre-defined speed (less than 5 miles per hour). It will be appreciated that in some embodiments, the electronic device 58 may be the HMI 74, or any other electronic device 58 disposed within the vehicle 28.

With further reference to FIGS. 3 and 4, the vehicle 28 may additionally include the HMI 74 that may be used for controlling a plurality of functions within the vehicle 28, including, but not limited to, air conditioning settings, seat settings, sound settings, and/or navigational settings. The HMI 74 may also include a display 94 that may display any desired information about the settings and/or any other information about the vehicle 28. The display 94 may also provide any desired information about the light system 48, the electronic device 58, and/or any application 60 on the electronic device 58. Additionally, the HMI 74 and/or the display 94 may be used to control features of the light system 48, the electronic device 58, and/or any application 60 on the electronic device 58. For example, the display 94 may provide information pertaining to the current trip while the vehicle 28 is in commercial use.

The seat sensor 86, which includes, but is not limited to, any type of proximity sensor, seat airbag sensor, pressure sensor, etc., may be utilized for initiating an illumination sequence of the light system 48. For example, if the occupant is not disposed on the driver's seat, the light system 48 may illuminate in a predefined color (e.g. red). The light system 48 may return to an unilluminated state once the occupant returns to the vehicle 28.

The light system 48 may also illuminate in conjunction with any standard illumination devices disposed on and/or within the vehicle 28. For example, the light source 50 may illuminate with, or instead of, the vehicle's turn indicators. Additionally, or alternatively, a portion of the light system 48 may illuminate that corresponds with a magnitude of rotation of the steering wheel through usage of the steering sensor 100. For instance, if the steering wheel is rotated more than 10 degrees to the left, a corresponding portion on the left side of the light system 48 becomes illuminated.

A light sensor 98 may be utilized for varying the intensity of excitation light 24 emitted from the light source 50. The light sensor 98 may be integrated into the vehicle 28 or into the light system 48. Moreover, the intensity of excitation light 24 may additionally, or alternatively, be varied with the initiation of the vehicle's headlights.

Referring to FIGS. 5 and 6, the window 44, which is shown in an enlarged view for illustrative purposes, includes a first or outer transparent and/or translucent panel 102. The outer panel 102 has a first side 104 or outer surface and a second side 106 or inner surface. The window 44 may also include a second or inner transparent and/or translucent panel 108. The inner panel 108 has a third side 110 or outer surface and a fourth side 112 or inner surface. The outer panel 102 and inner panel 108 are spaced from each other by a gap 114 therebetween of a predetermined thickness. It will be appreciated that each component of the window 44 provided herein may be of any thickness without departing from the scope of the present disclosure.

The luminescent structure 10 may be disposed within the gap 114, or otherwise arranged on the window 44. The light source 50, which may be disposed on a printed circuit board (PCB) 116 is operably, or optically, coupled with a light guide 118 that may also be disposed within the gap 114. The light source 50 may include any form of light source. For example fluorescent lighting, light emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting.

The light guide 118 is configured to direct excitation light 24 towards the luminescent structure 10. In some embodiments, the light system 48 may employ additional light sources 50 and/or light guides for illuminating the luminescent structure 10, and consequently, indicia 54 independently. For example, the indicia 54 may form turn signals that may be illuminated by any of the light sources 50.

Referring to FIGS. 5 and 6, the light guide 118 is disposed inwardly of the outer panel 102 and may include the luminescent structure 10 on a portion thereof. The light guide 118 is a substantially transparent or translucent guide suitable for transmitting light (e.g., excitation light 24) and is operably coupled with the light source 50. The light source 50 may be provided on the flexible or rigid PCB 116 that is secured to the vehicle 28.

The light guide 118 may be formed from a rigid material that is comprised of a curable substrate such as a polymerizable compound, a mold in clear (MIC) material or mixtures thereof. Acrylates are also used for forming rigid light pipes, as well as poly methyl methacrylate (PMMA), which is a known substitute for glass. A polycarbonate material may also be used in an injection molding process to form the rigid light guide 118. Further, the light guide 118 may be a flexible light guide, wherein a suitable flexible material is used to create the light guide 118. Such flexible materials include urethanes, silicone, thermoplastic polyurethane (TPU), or other like optical grade flexible materials. Whether the light guide 118 is flexible or rigid, the light guide 118, when formed, is substantially optically transparent and/or translucent and capable of transmitting excitation light 24. The light guide 118 may be referred to as a light pipe, a light plate, a light bar or any other light carrying or transmitting substrate made from a clear or substantially translucent material.

A light-blocking layer 120 may be adhered to, printed on, and/or otherwise disposed on the outer panel 102, the inner panel 108, and/or the light guide 118 through an adhesive layer 122. The adhesive layer 122 may be an optically clear adhesive. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In one embodiment, the adhesive has about 10% haze or less, particularly about 5% haze or less, and more particularly about 2% haze or less.

In operation, the luminescent structure 10, which may be disposed on and/or within the light guide 118 and/or the light-blocking layer(s) 120, is formulated to become excited upon receiving excitation light 24 of a specific wavelength from the light source 50 that is directed through the light guide 118. As a result, the excitation light 24 undergoes an energy conversion process and is re-emitted at a different wavelength that may be transmitted through the light-blocking layer(s) 120.

The luminescent structure 10 may be disposed on a first side 124 of the light guide 118, such as the outwardly facing side of the light guide 118. An opposing, second side 126 of the light guide 118 may include optics 128 thereon for assisting in directing excitation light 24 towards the luminescent structure 10. The optics 128 may be etched, molded, coupled to, or otherwise disposed on the light guide 118 such that additional light is directed towards the luminescent structure 10. The optics 128, according to one embodiment, are faintly etched onto the light guide 118 such that the optics 128 are not readily visible (i.e., easily noticeable at distances over two feet) to an onlooker of the light system 48.

Still referring to FIGS. 5 and 6, a seal 130 may be disposed around a periphery of the window 44. According to one embodiment, the seal 130 may define a cavity 132 that may house the light source 50. The seal 130 is capable of carrying compression loads without being unduly deformed relative to its normal sealing position.

Referring to FIG. 6, the light guide 118 may have a tapered core 134 to direct excitation light 24 that is emitted from the light source 50 towards the luminescent structure 10. The tapered core 134 decreases in thickness in the direction in which the excitation light 24 is transmitted. As a result, the amount of excitation light 24 transmitted therethrough is increased. By using this arrangement, the diameter of the light beam, which originally is large, can be decreased prior to transmission through the light guide 118, simultaneously increasing the power density of the excitation light 24 towards the luminescent structure 10 disposed on the light guide 118 and/or the light-blocking layer(s) 120. A dot pattern, a microstructure 136, and/or any other etched pattern is formed on the opposing surface of the light guide 118 to diffuse light incident within the light guide 118 and further direct excitation light 24 towards the luminescent structure 10.

In some embodiments, the thickness of the light-blocking layer(s) 120 may be non-uniform to compensate for various geometries of the light guide core 134 such that the outer and inner panels 38, 44 are separated from one another at a substantially constant distance. Additionally, or alternatively, the adhesive layer may vary in thickness to compensate for variances in thickness of the light-blocking layer(s) 120, the light guide 118, the optics 128, the luminescent structure 10, and/or any other component disposed within the gap 114. Moreover, in some embodiments, a spacer 138 may be utilized to maintain the gap 114 between the outer panel 102 and the inner panel 108.

Figure 7:
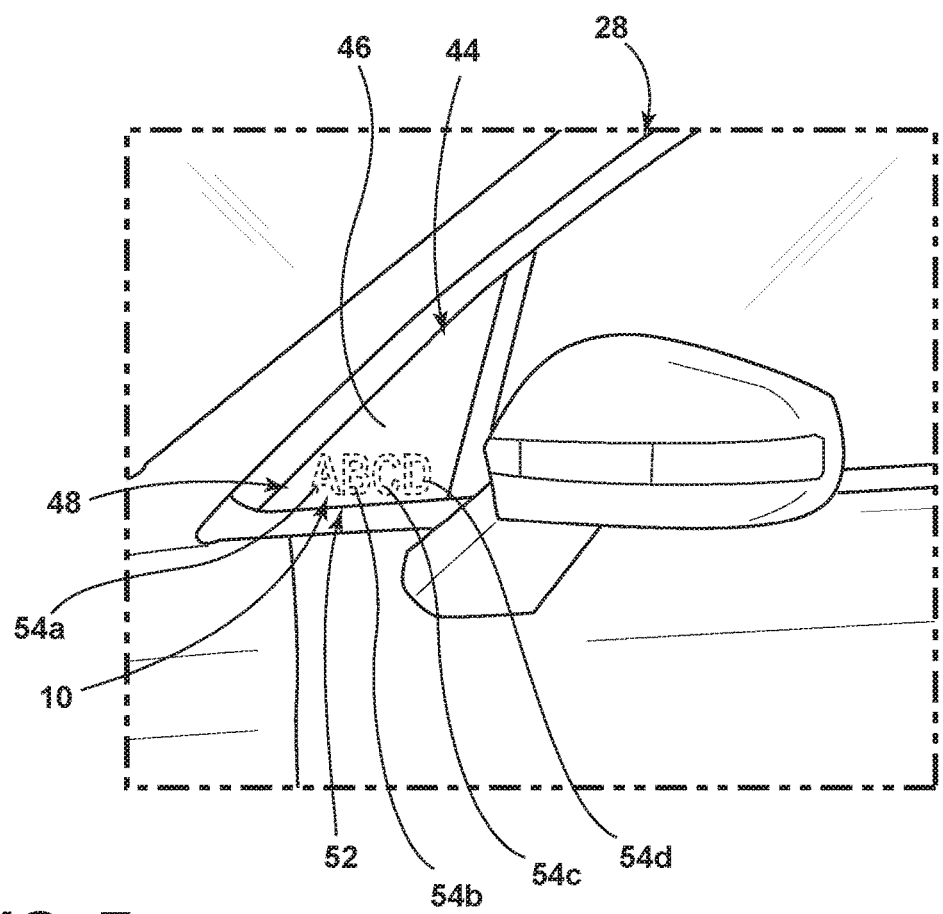
FIG. 7 is an enhanced side perspective view of area VII of FIG. 2 illustrating the light system on the vehicle in an unilluminated state, according to one embodiment.
Figure 8:
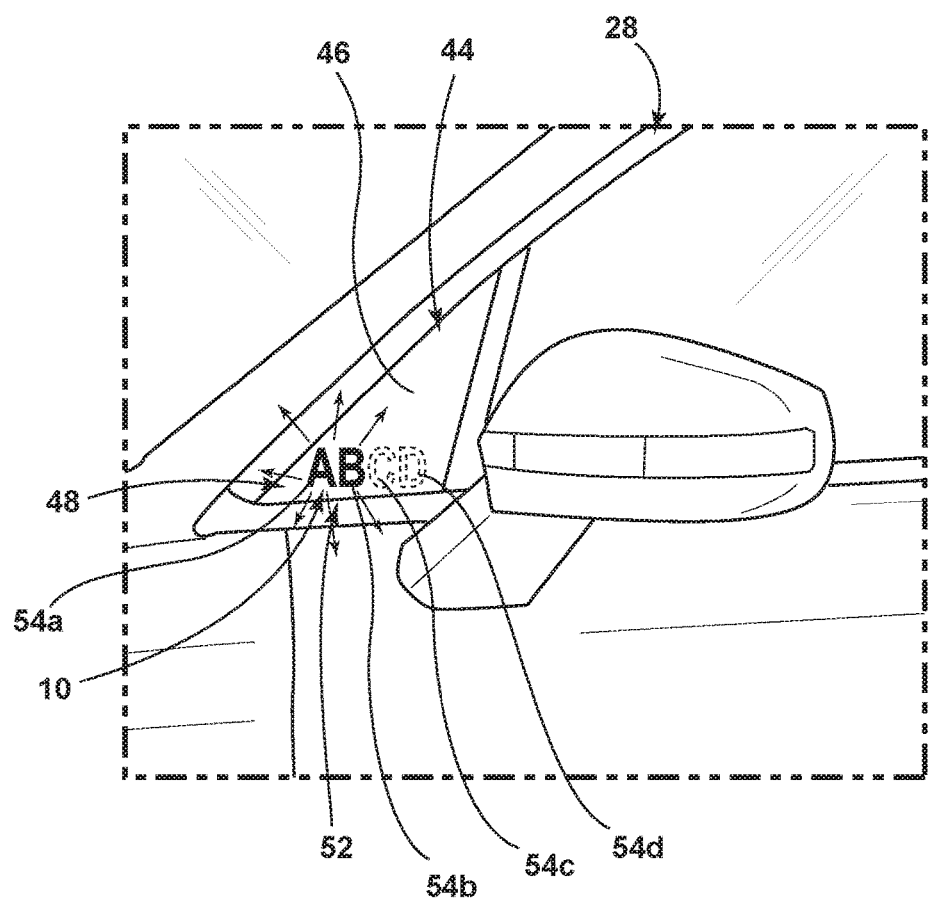
FIG. 8 is an enhanced side perspective view of area VII of FIG. 2 illustrating the light system on the vehicle having a first indicia in a luminescent state, according to one embodiment.
Figure 9:
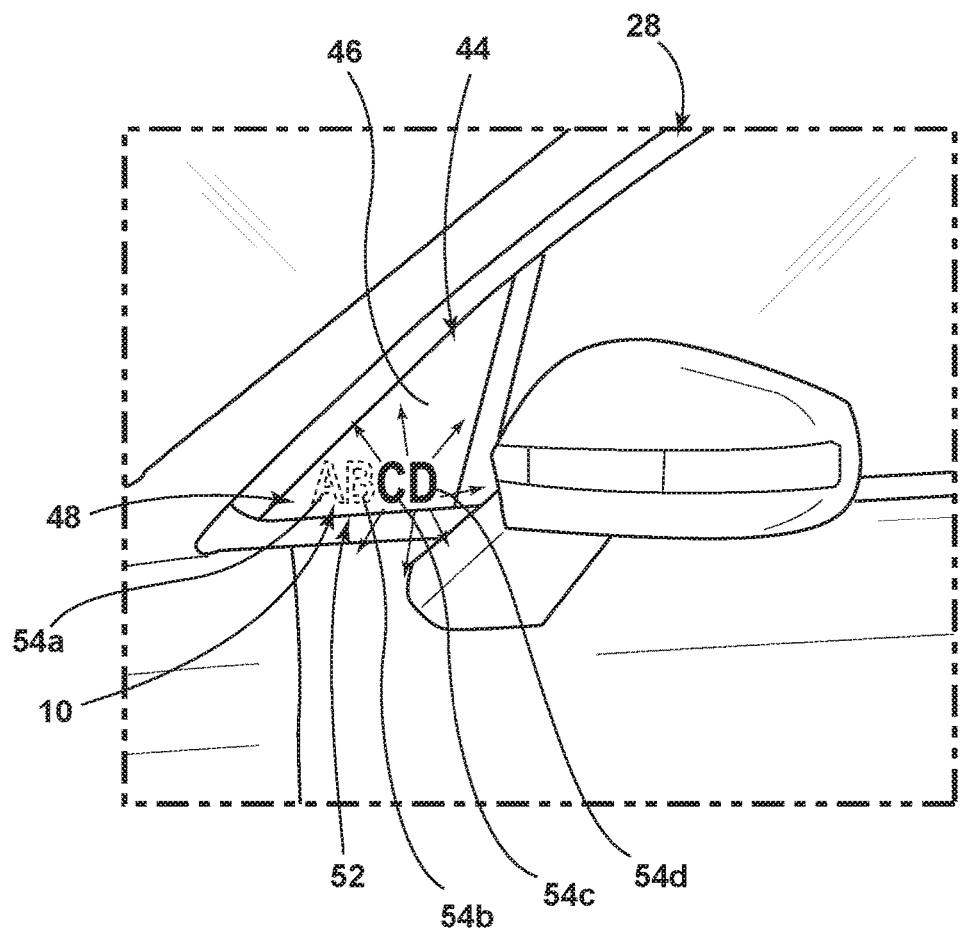
FIG. 9 is an enhanced side perspective view of area VII of FIG. 2 illustrating the light system on the vehicle having second indicia in a luminescent state, according to one embodiment.

Referring to FIGS. 7-9, the indicia 54 are in the form of one or more letters on the front quarter window 46. The letters may be used to provide any desired notification, such as when the vehicle 28 is being used for commercial purposes and/or while an associated application 60 is operating on an occupant's electronic device 58. Accordingly, when a vehicle occupant initiates the application 60, some, or all, of the indicia 54 may luminesce in response to initiation of the application 60 and/or in response to a chosen state, feature, task, job, or setting within the application 60. It will be appreciated, however, that the indicia 54 may additionally, or alternatively, form turn signals, insignia indicating a vehicle manufacturer, a user defined message, an image, a trademark, and/or any other desired information.

Moreover, the light source 50 may emit a plurality of wavelengths of excitation light 24 that excite unique luminescent structures 10*a*, 10*b* (FIG. 4) such that more than one set of indicia 54 may independently luminesce.

With further reference to FIGS. 7-9, non-concealed components of the light system 48, such as the outer panel 102, light-blocking layer(s) 120, light guide 118, and luminescent structure 10, may be substantially transparent, translucent, and/or not readily visible when the light source 50 is unilluminated, as shown in FIG. 7. When a corresponding light source 50 is illuminated, the luminescent structure 10 may luminesce in response to receiving excitation light 24 from the light source 50, as shown in FIG. 7.

As illustrated in FIGS. 7-9, the vehicle 28 may be used for personal purposes in some instances, in which case the indicia 54 may be substantially non-visible. In other instances, the vehicle 28 may be used in conjunction with a first commercial entity, affiliation, or service causing a first indicia 54*a*, 54*b* (FIG. 8) to illuminate. When the vehicle 28 is used through a second commercial entity, affiliation, or service at a still other instances, a second indicia 54*c*, 54*d* (FIG. 9) may illuminate.

A wide range of luminescent materials 18 that luminesce in response to UV light, or any other wavelength of excitation light 24, may be substantially non-visible in an unexcited state, each of which may be utilized without departing from the scope of the present disclosure. Upon illumination of an associated light source 50, the luminescent material 18 may luminesce in the visible portion of the light spectrum. According to one embodiment, the luminescent structure 10 may include a mixture of UV light and infrared (IR) light excitable luminescent materials 18 therein that are capable of exciting the luminescent structure 10.

In some embodiments, the light source 50 may emit significant intensities of light that is transmitted through the light guide 118. The light-blocking layer(s) 120 maintain substantially all of the emitted excitation light 24 from exiting through the outer panel 102 and/or the inner panel 108. The significant intensities of light may be utilized to ensure that the luminescent structure 10 is luminescing near the full capacity of the luminescent structure 10 such that the indicia 54 are visible during all conditions. Since lighting conditions may vary depending on a plurality of factors including, but not limited to, the current time, date, and weather conditions, the intensity of excitation light 24 emitted from the light source 50 may be adjusted by the controller 76 such that illumination of the luminescent structure 10 may be noticed under any condition. For example, the light intensity in Florida during a clear summer afternoon will generally be higher than the light intensity in Michigan during an overcast winter morning. Thus, by making this type of information known to the controller 76, the controller 76 can adjust any light source 50.

According to various embodiments, the luminescent structure 10 discussed herein is substantially Lambertian, that is, the apparent brightness of the luminescent structure 10 is substantially constant regardless of an observer's angle of view. As described herein, the color of the converted light 26 may be significantly dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

A variety of advantages may be derived from the use of the present disclosure. For example, use of the light system disclosed herein provides a unique aesthetic appearance to the vehicle. Moreover, the light system may provide information about the vehicle when the vehicle is in commercial use. The light system may be manufactured at low costs when compared to standard vehicle decal assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A window for a vehicle, comprising:
    a light guide disposed between an outer panel and an inner panel;
    a light source optically coupled with the light guide and configured to direct excitation light towards a luminescent structure, the light source disposed within a seal surrounding the periphery of the outer and inner panels; and
    a controller configured to illuminate the light source when an electronic device having an application thereon is in operation; and
    first and second light-blocking layers disposed on opposing sides of the light guide, the first light-blocking layer disposed between the light guide and the inner panel and the second light-blocking layer disposed between the light guide and the outer panel wherein the light source emits excitation light in the UV spectrum and the first and second light-blocking layers block light in the UV spectrum from transmission therethrough.

2. The window for a vehicle of claim 1, wherein the window is a front quarter window.

3. The window for a vehicle of claim 1, wherein the luminescent structure comprises at least one luminescent material configured to convert the excitation light in a non-visible spectrum received from the light source into a visible, converted light.

4. The window for a vehicle of claim 1, wherein the luminescent structure defines a first set of indicia and a second set of indicia.

5. The window for a vehicle of claim 4, wherein the light source is configured to emit varied wavelengths to luminesce the first set of indicia and the second set of indicia independently.

6. The window for a vehicle of claim 1, further comprising:
    an indicia disposed on an interior side of the light guide, the symbol configured to indicate a turn signal status when the turn signal corresponding to a common side of the vehicle of the indicia is initiated.

7. A light system for a vehicle, comprising:
    a light source optically coupled with a light guide, the light guide directing light towards a luminescent structure first and second indicia defined by a luminescent structure;
    an electronic device in wireless communication with the light source; and
    first and second light-blocking layers disposed on opposing sides of the light guide, the first light-blocking layer disposed between the light guide and an inner panel and the second light-blocking layer disposed between the light guide and an outer panel.

8. The light system for a vehicle of claim 7, wherein the luminescent structure is substantially non-visible in an unexcited state.

9. The light system for a vehicle of claim 8, wherein the indicia luminesce while the vehicle is being used for commercial purposes.

10. The light system for a vehicle of claim 7, further comprising:
a seat sensor, wherein the light source is deactivated when the seat sensor detects that a seat of the vehicle is occupied indicating an incoming passenger has entered the vehicle.

11. The light system for a vehicle of claim 10, further comprising:
a navigation system, wherein the light source is illuminated as the navigation system detects that the vehicle is approaching its destination through a location sensing routine stored in memory of a controller electrically coupled with the light source.

12. The light system for a vehicle of claim 7, wherein the light guide has a tapered core, wherein a thicker first portion is disposed proximately to the light source and a thinner second portion is disposed further from the light source than the first portion.

13. A light system for a vehicle, comprising:
a light source optically coupled to a light guide;
an indicia defined by a luminescent structure that luminesces in response to receiving excitation light from the light source; a controller configured to activate the light source based on an initiation of an application on an electronic device; and first and second light-blocking layers disposed on opposing sides of the light guide, the first light-blocking layer disposed between the light guide and an inner panel and the second light-blocking layer disposed between the light guide and an outer panel.

14. The light system for a vehicle of claim 13, wherein the controller includes one or more wireless communication transceivers for altering characteristics of the light source.

15. The light system for a vehicle of claim 14, wherein the controller associated with the wireless communication transceiver is configured to store information about the electronic device.

16. The light system for a vehicle of claim 13, wherein the indicia is arranged to indicate one of a left turn and a right turn when in a luminescent state.

17. The light system for a vehicle of claim 13, wherein the indicia luminesce in a first state when the electronic device performs a first function and in a second state when the electronic device performs a second function.

18. The light system for a vehicle of claim 13, wherein the luminescent structure is substantially non-visible in an unexcited state.

19. The light system for a vehicle of claim 13, wherein the light guide includes optics that are configured to direct an excitation light emitted from the light source towards the indicia.

* * * * *